US009190020B2

(12) United States Patent
Mishima et al.

(10) Patent No.: US 9,190,020 B2
(45) Date of Patent: Nov. 17, 2015

(54) IMAGE PROCESSING DEVICE, IMAGE PROCESSING METHOD, COMPUTER PROGRAM PRODUCT, AND STEREOSCOPIC DISPLAY APPARATUS FOR CALIBRATION

(71) Applicant: KABUSHIKI KAISHA TOSHIBA, Minato-ku, Tokyo (JP)

(72) Inventors: Nao Mishima, Tokyo (JP); Takeshi Mita, Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 85 days.

(21) Appl. No.: 13/970,828

(22) Filed: Aug. 20, 2013

(65) Prior Publication Data
US 2014/0071181 A1    Mar. 13, 2014

(30) Foreign Application Priority Data

Sep. 11, 2012 (JP) ................................. 2012-199759

(51) Int. Cl.
*G09G 5/10* (2006.01)
*H04N 13/04* (2006.01)

(52) U.S. Cl.
CPC .............. G09G 5/10 (2013.01); H04N 13/0404 (2013.01); H04N 13/0415 (2013.01); H04N 13/0425 (2013.01); H04N 13/0445 (2013.01); *G09G 2320/0209* (2013.01)

(58) Field of Classification Search
CPC ......... G09G 5/10; G09G 5/028; G09G 5/068; G09G 5/0693; G09G 5/08; G09G 2320/0209; H04N 13/0011; H04N 13/0282; H04N 13/0402; H04N 13/0404; H04N 13/0415; H04N 13/0425; H04N 13/0445; H04N 2013/0074
See application file for complete search history.

(56) References Cited

U.S. PATENT DOCUMENTS 6,801,243 B1 * 10/2004 Van Berkel ..................... 348/59
2004/0008251 A1 * 1/2004 Mashitani et al. .............. 348/51
(Continued)

FOREIGN PATENT DOCUMENTS

JP        4832833        9/2011

OTHER PUBLICATIONS

Notice of Rejection issued by the Japanese Patent Office on Jun. 17, 2014, for Japanese Patent Application No. 2012-199759, and English-language translation thereof.

(Continued)

*Primary Examiner* — Temesgh Ghebretinsae
*Assistant Examiner* — Keith Crawley
(74) *Attorney, Agent, or Firm* — Finnegan, Henderson, Farabow, Garrett & Dunner, L.L.P.

(57) ABSTRACT

According to an embodiment, an image processing device includes a first obtaining unit, a specifying unit, a first calculator, a second obtaining unit, and a selector. The first obtaining unit obtains a first parallax number representing a parallax image that is actually observed. The specifying unit specifies a panel parameter candidate. The first calculator calculates a second parallax number which represents a parallax image to be observed from the viewpoint position when the panel parameter is changed from the first panel parameter to the panel parameter candidate. The second obtaining unit obtains a third parallax number calculated when a first panel parameter candidate is specified, and the third parallax number is smaller than an error between the second parallax number calculated when a second panel parameter candidate is specified, and the third parallax number, the selector selects the first panel parameter candidate as the panel parameter.

10 Claims, 8 Drawing Sheets

(56) References Cited

U.S. PATENT DOCUMENTS

| | | | |
|---|---|---|---|
| 2006/0066718 A1* | 3/2006 | Yanagawa et al. | 348/51 |
| 2006/0245063 A1* | 11/2006 | Ra et al. | 359/619 |
| 2007/0268589 A1* | 11/2007 | Ra et al. | 359/619 |
| 2011/0164028 A1* | 7/2011 | Naske et al. | 345/419 |
| 2012/0038632 A1* | 2/2012 | Matsunaga et al. | 345/419 |
| 2013/0335403 A1* | 12/2013 | Chung et al. | 345/419 |
| 2014/0192170 A1* | 7/2014 | Samadani et al. | 348/51 |

OTHER PUBLICATIONS

Office Action, issued from the State Intellectual Property Office of the People's Republic of China in corresponding Patent Application No. 2013/10407465.4, dated Mar. 9, 2015, 11 pp.

* cited by examiner

IMAGE PROCESSING DEVICE, IMAGE PROCESSING METHOD, COMPUTER PROGRAM PRODUCT, AND STEREOSCOPIC DISPLAY APPARATUS FOR CALIBRATION

CROSS-REFERENCE TO RELATED APPLICATIONS

This application is based upon and claims the benefit of priority from Japanese Patent Application No. 2012-199759, filed on Sep. 11, 2012; the entire contents of which are incorporated herein by reference.

FIELD

Embodiments described herein relate generally to an image processing device, an image processing method, a computer program product, and a stereoscopic display apparatus.

BACKGROUND

In a glasses-free 3D panel (a glasses-free three-dimensional display device), in which a light beam control element having linear optical apertures, such as cylindrical lenses or barriers (slits), arranged in a cyclic manner in the horizontal direction is disposed at the front of a display element, such as a liquid crystal panel, for enabling stereoscopic viewing with the unaided eye; the positional relationship between the display element and the light beam control element is of considerable significance. This positional relationship can be expressed using a panel parameter (a panel parameter related to the correspondence relationship between the display element and the light beam control element) that includes, for example, at least one of the following: the tilt of the light beam control element with respect to the display element; the pitch of an image corresponding to a single optical aperture; and the phase that indicates the amount of shift between the display element and the light beam control element. Then, based on the panel parameter, multi-view 3D images (called parallax images) is placed on the display element to thereby perform an appropriate stereoscopic display. However, it is rare that the parallax images are placed according to the design value, and more than a little error is present. In this regard, a technology called calibration is known in which the error is assessed and the correct panel parameter is estimated.

As a conventional calibration technology, a technology is known in which a parallel line group is displayed on, for example, a 3D panel and is observed from a predetermined position, and the following operations are repeated in a cyclic manner until the display reaches an optimal state: changing the panel parameter→performing display that reflects the change in the panel parameter→observation.

However, in the conventional technology, since the operations of changing the panel parameter→performing display that reflects the change in the panel parameter→observation need to be repeated in a cyclic manner; it requires a long period of time to perform calibration.

DETAILED DESCRIPTION

According to an embodiment, an image processing device includes a first obtaining unit, a specifying unit, a first calculator, a second obtaining unit, and a selector. The first obtaining unit obtains a first parallax number representing a parallax image that is actually observed from a predetermined viewpoint position from among parallax images that are displayed on a display unit which includes a display element having a plurality of pixels arranged therein and a light beam control element for controlling emitting direction of light beams emitted from the display element and which is capable of displaying a stereoscopic image that includes a plurality of parallax images having mutually different parallaxes. The specifying unit specifies, as a panel parameter candidate, any one value within a possible range of values of a panel parameter which is related to a correspondence relationship between the display element and the light beam control element. The first calculator calculates, using the panel parameter candidate specified by the specifying unit and using a first panel parameter indicating the panel parameter at the time of observation, a second parallax number which represents a parallax image that is expected to be observed from the viewpoint position when the panel parameter is changed from the first panel parameter to the panel parameter candidate. The second obtaining unit obtains a third parallax number which represents a parallax image that is supposed to be observed from the viewpoint position. When an error between the second parallax number, which is calculated when a first panel parameter candidate is specified from among a plurality of panel parameter candidates specifiable by the specifying unit, and the third parallax number is smaller than an error between the second parallax number, which is calculated when a second panel parameter candidate that is different from the first panel parameter candidate is specified, and the third parallax number, the selector selects the first panel parameter candidate as the panel parameter.

Various embodiments will be described below in detail with reference to the accompanying drawings. In a stereoscopic display apparatus to each embodiment described below, a plurality of parallax images having mutually different parallaxes are displayed so as to enable the viewer to view a stereoscopic image. Herein, in the stereoscopic image display device, it is possible to implement a 3D display method such as the integral imaging method (II method) or the multi-view method. Examples of the stereoscopic image display device include a television (TV) set, a personal computer (PC), a smartphone, or a digital photo frame that enables a viewer to view a stereoscopic image with the unaided eye.

First Embodiment

Figure 1:
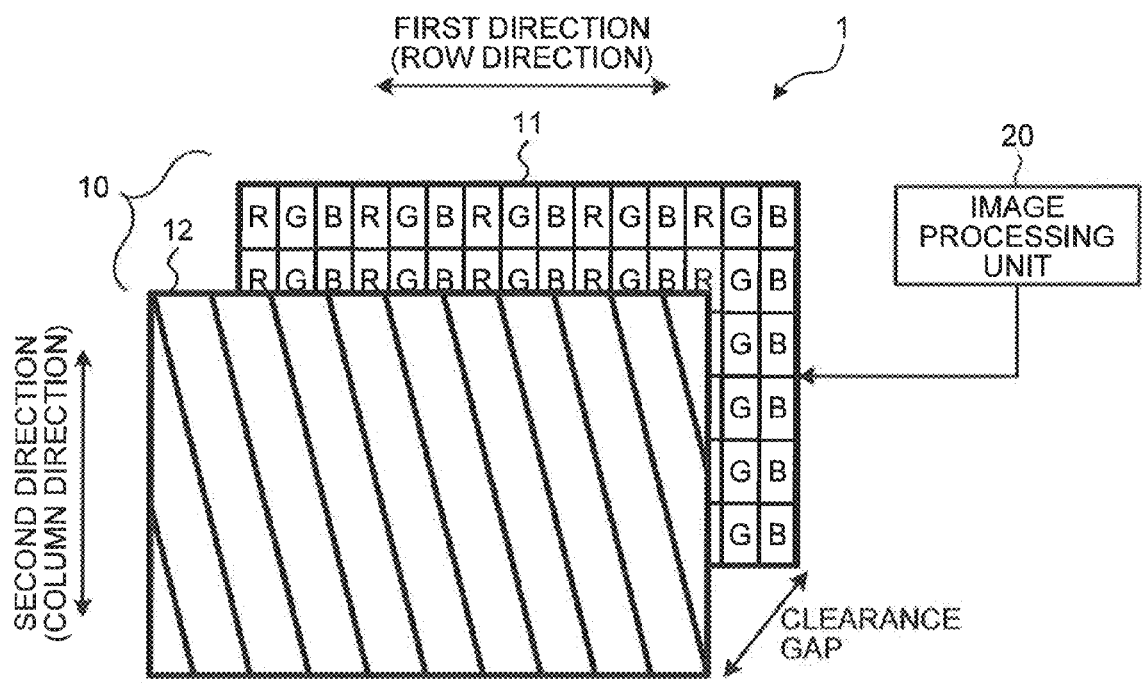
FIG. 1 is a diagram illustrating a stereoscopic display apparatus to embodiments.

FIG. 1 is an outline diagram illustrating a stereoscopic image display device 1 according to embodiments. The stereoscopic image display device 1 includes a display unit 10 and an image processing unit 20.

The display unit 10 is a device capable of displaying a stereoscopic image that includes a plurality of parallax images having mutually different parallaxes. As illustrated in FIG. 1, the display unit 10 includes a display element 11 and a light beam control element 12.

The parallax images constitute a stereoscopic image and are used in enabling the viewer to view the stereoscopic image. In a stereoscopic image, the pixels of each parallax image are assigned in such a way that, when the display element 11 is viewed from the viewpoint position of a viewer via the light beam control element 12, a particular parallax image is seen to one eye of the viewer and another parallax image is seen to the other eye of the viewer. That is, the stereoscopic image is generated by rearranging the pixels of each parallax image.

The display element 11 is used to display a stereoscopic image. In the display element 11 is arranged a plurality of pixels. More particularly, in the display element 11, a plurality of sub-pixels having different colors (such as red (R), green (G), and blue (B) colors) is arranged in a matrix-like manner in a first direction (the row direction) and a second direction (the column direction). In the example illustrated in FIG. 1, a single pixel is made of RGB sub-pixels. In the first direction, the sub-pixels are repeatedly arranged in the order of red (R), green (G), and blue (B) colors. In the second direction, the sub-pixels of the same color component are arranged. As the display element 11, it is possible to use a direct-view-type two-dimensional display such as an organic electro luminescence (organic EL), a liquid crystal display (LCD), a plasma display panel (PDP), or a projection-type display. Moreover, the display element 11 can also have a configuration including a backlight. Meanwhile, the "sub-pixels" mentioned in the first embodiment can be considered to be corresponding to "pixels" mentioned in claims. Moreover, in the following explanation, the display element 11 is sometimes referred to as a panel.

The light beam control element 12 controls the direction of the light beam that is emitted from each sub-pixel of the display element 11. The light beam control element 12 has a plurality of linearly-extending optical apertures arranged in the first direction for emitting light beams. In the example illustrated in FIG. 1, the light beam control element 12 is a lenticular sheet on which a plurality of cylindrical lenses (which function as the optical apertures) is arranged. However, that is not the only possible case. Alternatively, for example, the light beam control element 12 can be a parallax barrier having a plurality of slits arranged thereon. Herein, a fixed distance (clearance gap) is maintained between the display element 11 and the light beam control element 12. Moreover, the light beam control element 12 is disposed in such a way that the extending direction of the optical apertures thereof has a predetermined tilt with respect to the second direction (the column direction) of the display element 11. As a result, there occurs a misalignment in the positions in the row direction of the optical apertures and display pixels. Hence, for each different height, there is a different visible area (i.e., the area within which a stereoscopic image can be viewed).

Figure 2:
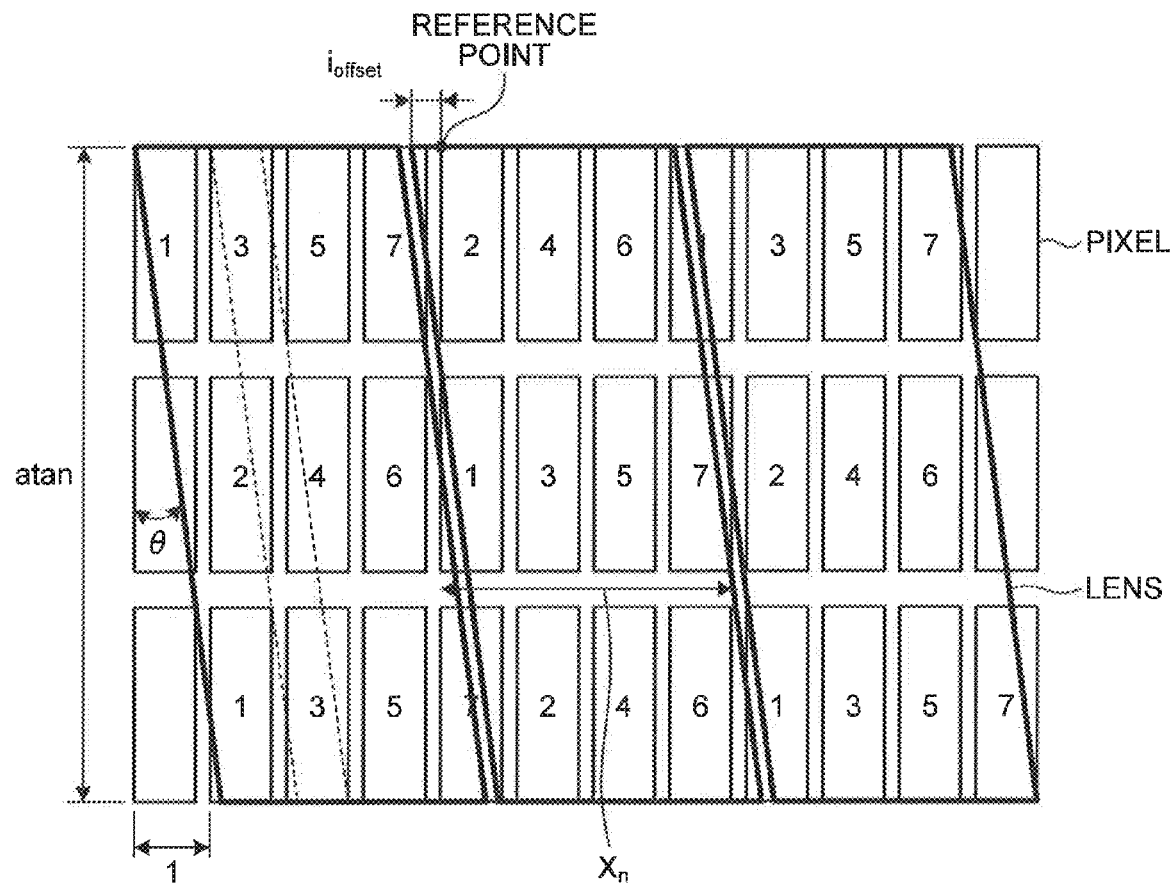
FIG. 2 is a diagram for explaining an example of pixel mapping performed according to the embodiments.

In the first embodiment, as illustrated in FIG. 2, the lenses are placed at a tilt on top of the sub-pixels. Hence, the sub-pixels that are visible through the lenses are, for example, along the dashed lines illustrated in FIG. 2. That is, although a plurality of sub-pixels in the display element 11 is arranged in a matrix-like manner in the horizontal direction and the vertical direction, the lenses are placed at a tilt on top of the sub-pixels. For that reason, in the case of assigning sub-pixels for displaying parallax images (i.e., in the case of performing pixel mapping), the sub-pixels need to be assigned according to the extending direction of the lenses. Herein, the explanation is given for an example in which sub-pixels displaying seven parallax images are assigned. The sub-pixels having the same number display the same parallax image. To each parallax image is assigned in advance a mutually exclusive number (parallax number) that differs by one from the number assigned to the adjoining parallax image. In the example illustrated in FIG. 2, to the first parallax image is assigned a parallax number "1"; to the adjoining second parallax image is assigned a parallax number "2"; to the adjoining third parallax image is assigned a parallax number "3"; to the adjoining fourth parallax image is assigned a parallax number "4"; to the adjoining fifth parallax image is assigned a parallax number "5"; to the adjoining sixth parallax image is assigned a parallax number "6"; and to the adjoining seventh parallax image is assigned a parallax number "7".

Moreover, pixel mapping is performed in such a way that, in the image corresponding to a single optical aperture (lens), the pixels of each of a plurality of parallax images corresponding to each viewpoint are included. From among a plurality of sub-pixels arranged in the display element 11, a parallax number v of a sub-pixel (i, j) at the i-th row and j-th column with respect to which pixel mapping is performed can be obtained according to Equation (1) given below using an arbitrary panel parameter $\Theta = (atan, X_n, i_{offset})$.

$$v(i, j | \Theta) = \frac{(\mathrm{mod}(i + i_{offset} - 3j \cdot a\tan, X_n))}{X_n} K \quad (1)$$

Herein, mod(x, K) represents the remainder obtained after dividing "x" by "K". In Equation (1); "K" represents the total number of parallaxes. Moreover, in Equation (1); "atan" is a parameter that represents the relative tilt of the light beam control element 12 with respect to the display element 11. If θ is considered to the angle made by the light beam control element 12 with respect to the display element 11, then atan is defined as "atan=1/tan θ". Furthermore, in Equation (1); "$X_n$" is a parameter that represents the pitch in the horizontal direction (the first direction) of the image corresponding to a single optical aperture. The unit of $X_n$ is pixel. Moreover, in FIG. 1, "$i_{offset}$" is a parameter that represents the amount of shift (phase shift) in the horizontal direction (the first direction) between the display element 11 and the light beam control element 12. The unit of $i_{offset}$ is pixel. In the example illustrated in FIG. 2, the top left end of an image is considered to be the reference point (origin), and the amount of shift between that reference point and the top left end of a lens is equal to $i_{offset}$.

The panel parameter Θ is the parameter related to the correspondence relationship between the display element 11 and the light beam control element 12. In the first embodiment, the panel parameter Θ consists of the parameter atan that represents the relative tilt of the light beam control element 12 with respect to the display element 11; the parameter $X_n$ that represents the pitch of the image corresponding to a single optical aperture; and the parameter $i_{offset}$ that represents the phase shift between the display element 11 and the light beam control element 12. However, that is not the only possible case. Alternatively, for example, as the panel parameter Θ, it is possible to consider at least either the parameter atan that represents the relative tilt of the light beam control element 12 with respect to the display element 11; or the parameter $X_n$ that represents the pitch of the image corresponding to a single optical aperture; or the parameter $i_{offset}$ that represents the phase shift between the display element 11 and the light beam control element 12.

Herein, the parallax value v is a continuous value. However, since the parallax images are discrete in nature, the parallax images cannot be assigned without modification to the parallax number v. In that regard, an interpolation technique such as linear interpolation or three-dimensional interpolation is used. In this way, on the display unit 10 is displayed a plurality of parallax images having mutually different parallaxes.

Figure 3:
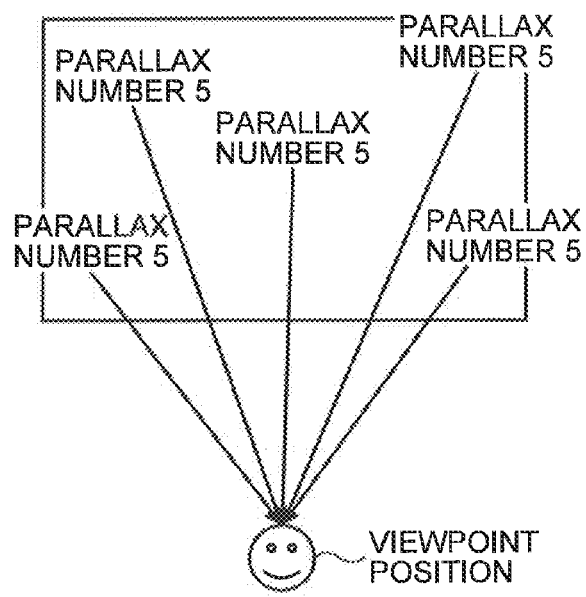
FIG. 3 is a diagram illustrating a parallax number that is actually observed in a display area according to the embodiments.

FIG. 3 is a diagram illustrating the parallax number of a parallax image that is actually observed in a stereoscopic image display area (a screen) of the display unit 10 from a particular viewpoint position in the case when the number of parallaxes is nine (FIG. 3 can also be considered to be a diagram illustrating light beam parallax number data (described later)). In this example, it is assumed that the parallax image having the parallax number 5 is supposed to be observed from the particular viewpoint position. In the example illustrated in FIG. 3, the light from the sub-pixels having the parallax number 5 falls at the particular viewpoint position from the display unit 10. Hence, if the viewer views the display unit 10 from the particular viewpoint position with one eye, then the parallax image having the parallax number 5 can be viewed throughout the entire area of the display unit 10.

Figure 4:
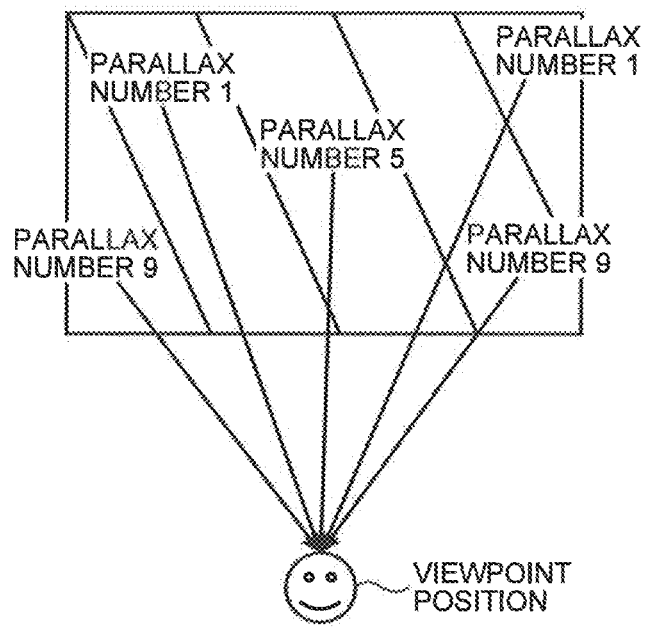
FIG. 4 is a diagram illustrating parallax numbers that are actually observed in the display area according to the embodiments.

In contrast, as illustrated in FIG. 4, consider the case when the light from the sub-pixels having different parallax numbers (1, 5, and 9) falls at the particular viewpoint position from the display unit 10. In that case, if the viewer views the display unit 10 from the particular viewpoint position with one eye, then the parallax images having different parallax numbers can be viewed. However, in this case, the display area of the display unit 10 gets partitioned into an area within which a stereoscopic image can be viewed and an area within which a stereoscopic image cannot be viewed (i.e., a pseudoscopic area). Hence, the viewer cannot view the stereoscopic image throughout the entire screen. Since it is rare that the panel parameter is set according to the design value; usually, it is necessary to perform calibration for adjusting the panel parameter in order to ensure that the parallax image that is supposed to be observed from the particular viewpoint position is actually observed (i.e., in order to ensure that the viewer can view the stereoscopic image throughout the entire screen).

In the first embodiment, light beam parallax number data is used that enables identification of the parallax number of the parallax image which is actually observed from a predetermined viewpoint position from among the parallax images displayed on the display unit 10; and calculation is performed regarding the manner in which the light beam parallax number data undergoes a change in response to a change in the panel parameter. With that, it becomes possible to eliminate the need to repeat in a cyclic manner the operations of changing the panel parameter→performing display that reflects the change in the panel parameter→observation. As a result, it becomes possible to reduce the amount of time required to perform calibration. Given below is the detailed explanation.

Figure 5:
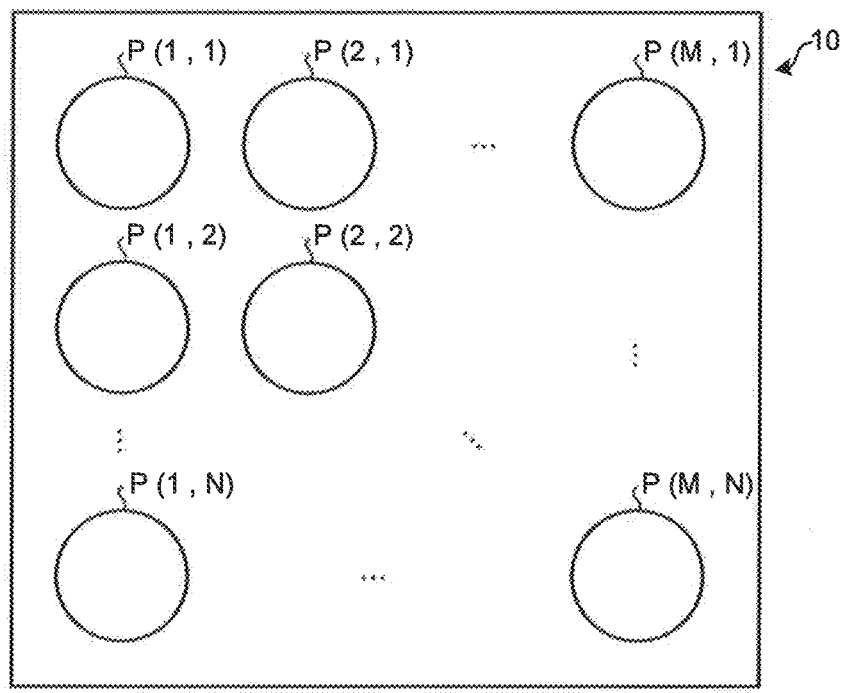
FIG. 5 is a diagram illustrating an example of a plurality of image areas obtained by dividing the display area according to the embodiments.

Herein, as illustrated in FIG. 5, the display area of the display unit 10 is divided into a plurality of image areas P arranged in a matrix of M rows and N columns. For example, the image area P at the m-th row (≤M) and the n-th column (≤N) is written as P(m, n). In each image area P is displayed at least a single elemental image that includes the pixels of each of a plurality of parallax images corresponding to each viewpoint. Herein, the explanation is given for an example in which a single elemental image is displayed in a single image area P. Moreover, data that enables identification of the parallax number that is actually observed in each image area P from an arbitrary viewpoint position is called the light beam parallax number data; and the number of horizontal divisions and the number of vertical divisions of the screen of the light beam parallax number data are respectively considered to be M (number of rows) and N (number of columns). In the following explanation, from among the parallax images displayed in the image area P(m, n), the parallax number representing the parallax image that is actually observed from the viewpoint position is sometimes written as light beam parallax number data $L_O(m, n)$. Meanwhile, the light beam parallax number data can be considered to be corresponding to a "first parallax number" mentioned in claims.

Meanwhile, the method of obtaining the light beam parallax number data is arbitrary. For example, the light beam parallax number data can be obtained by operating a luminance meter that is used in measuring the luminance of the light beams emitted from the display unit 10. Alternatively, the light beam parallax number data can be obtained by visually confirming the parallax images that are illuminated in rotation. Still alternatively, the light beam parallax number data can be obtained by capturing the parallax images illuminated in rotation (or capturing a plurality of copies) and by analyzing the image capturing result.

In the first embodiment, the light beam parallax number data, which enables identification of the parallax number that is actually observed in each image area P from a predetermined viewpoint position, is registered in a memory device (not illustrated). The location of the memory device is arbitrary. For example, the memory device can be installed in the image processing unit 20. Alternatively, the memory device can be installed in an external device (such as a server device). On the premise of the explanation given above, the detailed aspects of the image processing unit 20 according to the first embodiment are explained below.

Figure 6:
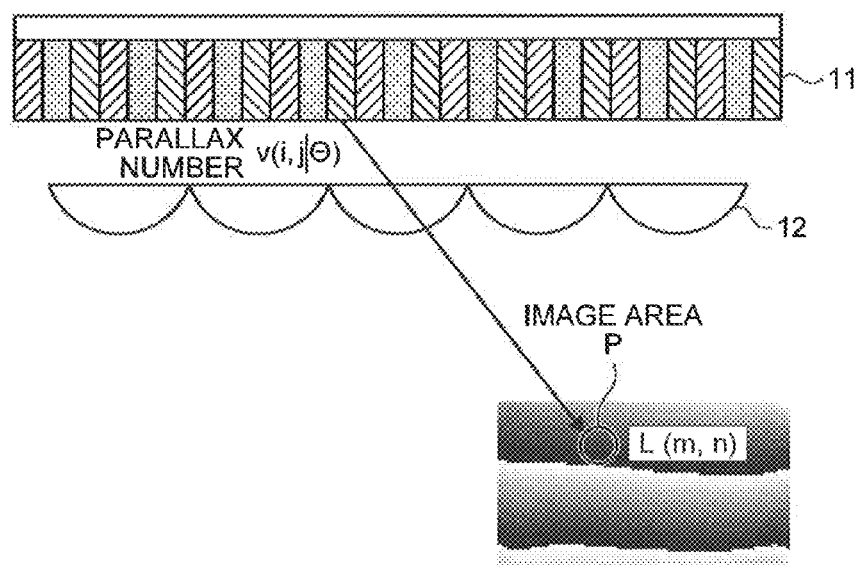
FIG. 6 is a diagram illustrating the relationship between the parallax number of a sub-pixel and light beam parallax number data according to the embodiments.

Prior to explaining the details of the image processing unit 20, the explanation is given about a brief overview of the calibration operation performed by the image processing unit 20. In FIG. 6 is illustrated the relationship between the parallax number of the sub-pixel (i, j) obtained according to Equation (1) given above and the actually-observed light beam parallax number data (i.e., the parallax number representing the parallax image that is actually observed from a predetermined viewpoint position from among the parallax images displayed in the image area P corresponding to the sub-pixel (i, j)). Herein, if "W" represents the number of sub-pixels in the first direction (the row direction) of the display element 11, if "H" represents the number of sub-pixels in the second direction (the column direction) of the display element 11, and if $(i, j)^T$ represents the position coordinate of the sub-pixel of the display element 11 that is positioned beneath a lens; then the relationship between the sub-pixel position $(i, j)^T$ and the coordinate position $(m, n)^T$ of the image area P is expressed using Equation (2) given below.

$$\begin{bmatrix} m \\ n \end{bmatrix} = \begin{bmatrix} \frac{M}{W}i \\ \frac{N}{H}j \end{bmatrix} \quad (2)$$

Conversely, the sub-pixel position $(i, j)^T$ corresponding to the coordinate position $(m, n)^T$ of the image area P is expressed using Equation (3) given below.

$$\begin{bmatrix} i \\ j \end{bmatrix} = \begin{bmatrix} \frac{W}{M}m \\ \frac{H}{N}n \end{bmatrix} \quad (3)$$

Thus, according to Equation (1) and Equation (3) given above, the parallax number of the sub-pixel position corresponding to the image area P at the coordinate position $(m, n)^T$ becomes equal to $v\{(W \times m)/M, (H \times n)/N | \Theta_0\}$. Herein, $\Theta_0$ represents the panel parameter at the time of observation. In this example, $\Theta_0$ is assumed to be equal to $(atan_0, X_{n0}, i_{offset0})$. In the following explanation, the panel parameter $\Theta_0$ at the time of observation is sometimes called a "first panel parameter $\Theta_0$". Moreover, the actually-observed light beam parallax number data (i.e., the light beam parallax number data corresponding to the image area P at the coordinate position $(m, n)^T$) is written as $L_0(m, n)$. At this point, if $c(m, n)$ represents the amount of change depending on the positional relationship between the display element 11 and the light beam control element 12 or depending on the lens characteristics; then a relationship expressed below in Equation (4) is established between $v\{(W \times m)/M, (H \times n)/N | \Theta_0\}$, $L_0(m, n)$, and $c(m, n)$.

$$L_0(m, n) = v\left(\frac{W}{M}m, \frac{H}{N}n \mid \Theta_0\right) + C(m, n) \quad (4)$$

The amount of change $c(m, n)$ is uniquely determined according to hardware settings, and is unique to each panel regardless of the parallax numbers that are placed.

Consider a case in which the first panel parameter $\Theta_0 = (atan_0, X_{n0}, i_{offset0})$ is changed to a panel parameter $\Theta_0' = (atan', X_n', i_{offset}')$. In the case of the panel parameter $\Theta' = (atan', X_n', i_{offset}')$, the parallax number of the sub-pixel position corresponding to the image area P at the coordinate position $(m, n)^T$ becomes equal to $v\{(W \times m)/M, (H \times n)/N | \Theta'\}$. Hence, in the case when the first panel parameter $\Theta_0$ is changed to the panel parameter $\Theta'$, a parallax number $L'(m, n|\Theta')$ that represents the parallax image expected to be observed from the viewpoint position can be expressed using Equation (5) given below.

$$L'(m, n \mid \Theta') = v\left(\frac{W}{M}n, \frac{H}{N}n \mid \Theta'\right) + C(m, n) \quad (5)$$

Herein, the amount of change $c(m, n)$ becomes a constant value regardless of the change in the panel parameter. Thus, if the amount of change $c(m, n)$ is removed from Equation (4) and Equation (5) given above, the parallax number $L'(m, n|\Theta')$ can be expressed using Equation (6) given below.

$$L'(m, n \mid \Theta') = L_0(m, n) + \left\{v\left(\frac{W}{M}m, \frac{H}{N}n \mid \Theta'\right) - v\left(\frac{W}{M}m, \frac{H}{N}n \mid \Theta_0\right)\right\} \quad (6)$$

In the first embodiment, from a possible range of values of the panel parameter, any one value is specified as a panel parameter candidate. Then, using the specified panel parameter candidate, using the first panel parameter 80, and using the actually-observed light beam parallax number data $L_0(m, n)$; a parallax number $L'(m, n|\Theta')$ is calculated that represents the parallax image which is expected to be observed from the viewpoint position when the panel parameter is changed to the specified panel parameter (in the following explanation, the parallax number $L'(m, n|\Theta')$ is sometimes called a "second parallax number") (see FIG. 6). In the first embodiment, from among a plurality of panel parameter candidates that can be specified; the panel parameter candidate having the smallest error between the second parallax number and a third parallax number, which represents the parallax image that is supposed to be observed from the predetermined viewpoint position, is selected as the most suitable panel parameter that has been calibrated. Explained below are the details of the image processing unit 20.

Figure 7:
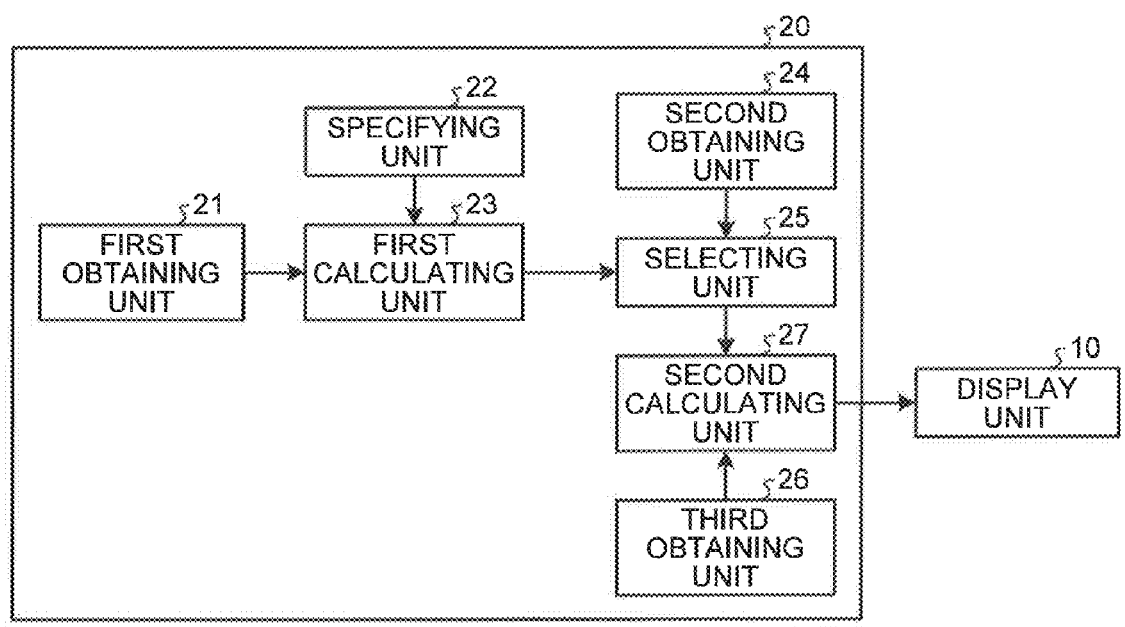
FIG. 7 is a diagram illustrating a configuration example of an image processing unit according to a first embodiment.

FIG. 7 is a block diagram illustrating a configuration example of the image processing unit 20. As illustrated in FIG. 7, the image processing unit 20 includes a first obtaining unit 21, a specifying unit 22, a first calculating unit 23, a second obtaining unit 24, a selecting unit 25, a third obtaining unit 26, and a second calculating unit 27.

The first obtaining unit 21 obtains, for each image area P, the first parallax number that represents the parallax image which is actually observed from a predetermined viewpoint position from among the parallax images displayed in that image area P. In the first embodiment, the first obtaining unit 21 obtains the light beam parallax number data, which enables identification of the parallax number of the parallax image that is actually observed in each image area P from the predetermined viewpoint position, from the memory device (not illustrated); and obtains the first parallax number corresponding to each image area P.

The specifying unit 22 specifies, as a panel parameter candidate, any one value from a possible range of values of the panel parameter related to the correspondence relationship between the display element 11 and the light beam control element 12. In the first embodiment; the possible range of each of atan, $X_n$, and $i_{offset}$ is divided equally, and a combination of divided points (values) can be specified as the panel parameter candidate.

The first calculating unit 23 makes use of the panel parameter candidate specified by the specifying unit 22 and the first panel parameter $\Theta_0$, and calculates the second parallax number that represents the parallax image which is expected to be observed from the viewpoint position when the panel parameter is changed from the first panel parameter $\Theta_0$ to the panel parameter candidate specified by the specifying unit 22. In the first embodiment, for each image area P, every time a panel parameter candidate is specified by the specifying unit 22; the first calculating unit 23 calculates the second parallax number corresponding to that image area P using the panel parameter candidate specified by the specifying unit 22, using the first panel parameter $\Theta_0$, and using the first parallax number obtained corresponding to that image area P by the first obtaining unit 21.

More particularly, the first calculating unit 23 calculates the second parallax number for each image area P by adding, to the first parallax number corresponding to that image area P, the difference between the parallax number of the sub-pixels that correspond to the image area P and that can be calculated using the panel parameter candidate specified by the specifying unit 22 (i.e., the parallax number representing the parallax image displayed by the sub-pixel) and the parallax number of the sub-pixels that correspond to the image area P and that can be calculated using the first panel parameter $\Theta_0$. As an example, consider a case in which $\Theta'=(\text{atan}', X_n', i_{offset}')$ is specified as the panel parameter candidate by the specifying unit 22, and the second parallax number $L'(m, n|\Theta')$ is calculated that corresponds to the image area P at the coordinate position $(m, n)^T$. In this case, the first calculating unit 23 makes use of the panel parameter candidate $\Theta'$ that has been specified, and calculates the parallax number $v\{(W \times m)/M, (H \times n)/N|\Theta\}$ of the sub-pixels corresponding to the image area P (see Equation (1) and Equation (3) given above). Moreover, the first calculating unit 23 makes use of the panel parameter candidate $\Theta_0$ that has been specified, and calculates the parallax number $v\{(W \times m)/M, (H \times n)/N|\Theta_0\}$ of the sub-pixels corresponding to the image area P (see Equation (1) and Equation (3) given above). Then, the first calculating unit 23 adds the difference between the parallax number $v\{(W \times m)/M, (H \times n)/N|\Theta'\}$ and the parallax number $v\{(W \times m)/M, (H \times n)/N|\Theta_0\}$ to the first parallax number corresponding to the image area P (i.e., to the light beam parallax number data $L_0(m, n)$ corresponding to the image area P at the coordinate position $(m, n)^T$); and calculates the parallax number $L'(m, n|\Theta')$ corresponding to that image area P (see Equation (6) given above).

The second obtaining unit 24 obtains the third parallax number which represents the parallax image that is supposed to be observed from a predetermined viewpoint position. In the first embodiment; target light beam parallax number data, which enables identification of the parallax number representing the parallax image that is supposed to be observed in each image area P from a predetermined viewpoint position (i.e., enables identification of the third parallax number), is registered in advance in a memory device (not illustrated). Herein, it is assumed that the size of the target light beam parallax number data is identical to the size of the light beam parallax number data described above. In the following explanation, from among the parallax images displayed in the image area P at the coordinate position $(m, n)^T$, the third parallax number representing the parallax image that is supposed to be actually observed from a predetermined viewpoint position is sometimes written as target light beam parallax number data $L_G(m, n)$. In the first embodiment, the second obtaining unit 24 obtains the target light beam parallax number data from the memory device (not illustrated) before the calibration operation (described later) is performed. With that, the second obtaining unit 24 obtains the third parallax number corresponding to each image area P and sends it to the selecting unit 25. Meanwhile, the location of the memory device is arbitrary. For example, the memory device can be installed in the image processing unit 20. Alternatively, the memory device can be installed in an external device (such as a server device).

For example, as illustrated in FIG. 3, in order to ensure that, when the viewer views the display unit 10 from a particular viewpoint position with one eye, the parallax image having the parallax number 5 is viewable throughout the entire area of the display unit 10; it is desirable that the third parallax number $L_G(m, n)$ indicating the parallax image that is supposed to be observed in each image area P is set to $L_G(m, n)=5$ ($0 \leq m \leq M$, $0 \leq n \leq N$). Meanwhile, as the target light beam parallax number data, it is possible to use arbitrary data. For example, a map of light beam parallax number data that is actually observed in an arbitrary panel can be used as the target light beam parallax number data.

If the error between the second parallax number, which is calculated in the case when a first panel parameter candidate is specified by the specifying unit 22 from among a plurality of specifiable panel parameter candidates, and the third parallax number obtained by the second obtaining unit 24 is smaller than the error between the second parallax number, which is calculated in the case when a second panel parameter candidate that is different from the first panel parameter candidate is specified by the specifying unit 22, and the third parallax number; then the selecting unit 25 selects the first panel parameter candidate as the most suitable panel parameter that has been calibrated. In the first embodiment, from among a plurality of panel parameter candidates that can be specified by the specifying unit 22, the selecting unit 25 selects the panel parameter candidate having the smallest error between the second parallax number and the third parallel number as the most suitable panel parameter that has been calibrated.

More detailed description is as follows. Every time the first calculating unit 23 calculates the second parallax number corresponding to each image area P, the selecting unit 25 obtains the difference (error) between the second parallax number corresponding to that image area P and the third parallax number obtained corresponding to that image area P by the second obtaining unit 24 (i.e., the selecting unit 25 obtains the error for each image area P). For example, the error corresponding to the image area P at the coordinate position $(m, n)^T$ can be defined as a squared error as given below in Equation (7).

$$e(m,n|\Theta')=(L'(m,n|\Theta')-L_G(m,n)) \quad (7)$$

Alternatively, the error corresponding to the image area P at the coordinate position $(m, n)^T$ can be defined as an absolute error as given below in Equation (8).

$$e(m,n|\Theta')=|L'(m,n|\Theta')-L_G(m,n)| \quad (8)$$

With that, the error of the entire display area (i.e., the entire screen) can be expressed using Equation (9) given below.

$$E(\Theta') = \sum_{m,n} (L'(m, n | \Theta') - L_G(m, n))^2 \quad (9)$$

Equation (9) given above indicates the sum of squared errors of the entire screen ($0 \leq m \leq M$, $0 \leq n \leq N$).

Then, the selecting unit 25 performs the smallest error determination as to whether or not the calculated error of the entire screen is the smallest. The method of performing the smallest error determination is arbitrary. One exemplary method is explained below. For example, a default smallest error value $E_{min}$ is set to a large value (such as $E_{min}=10^{10}$). Then, an error $E(\Theta')$ of the panel parameter candidate $\Theta'$ specified for the first time by the specifying unit 22 is compared with the smallest error value $E_{min}$. If the error $E(\Theta')$ is smaller than the smallest error value $E_{min}$, then the smallest error value $E_{min}$ is updated to the error $E(\Theta')$. In an identical manner, when the next panel parameter candidate is specified, the error calculated with respect to the panel parameter candidate is compared with the smallest error value $E_{min}$, and the smaller of the two error values is set as the smallest error value $E_{min}$. Once all panel parameter candidates have been specified, the selecting unit 25 selects the panel parameter candidate corresponding to the smallest error value $E_{min}$ as the most suitable panel parameter $\Theta_a$ that has been calibrated (i.e., the selecting unit 25 selects the panel parameter candidate having the smallest error). Meanwhile, instead of performing a full search in which the smallest error determination is performed for all panel parameter candidates, it is also possible to perform a commonly used non-linear optimization technique such as the method of steepest descent or the conjugate gradient method. Moreover, herein, the errors are calculated with respect to each image area P, and the panel parameter candidate having the smallest sum of errors is selected. However, that is not the only possible case. Alternatively, for example, the errors can be calculated by focusing on only a single image area P, and the panel parameter candidate having the smallest calculated error can be selected.

Meanwhile, if the difference (error) between the first panel parameter $\Theta_0$ and the third parallax number $L_G(m, n)$ obtained by the second obtaining unit 24 is smaller than the error corresponding to each of a plurality of panel parameter candidates that can be specified by the specifying unit 22 (i.e., if the difference (error) is smaller than the error between the second parallax number and the third parallax number when that particular panel parameter candidate is specified); then the selecting unit 25 can select the first panel parameter $\Theta_0$ as the most suitable panel parameter ea that has been calibrated.

Figure 8:
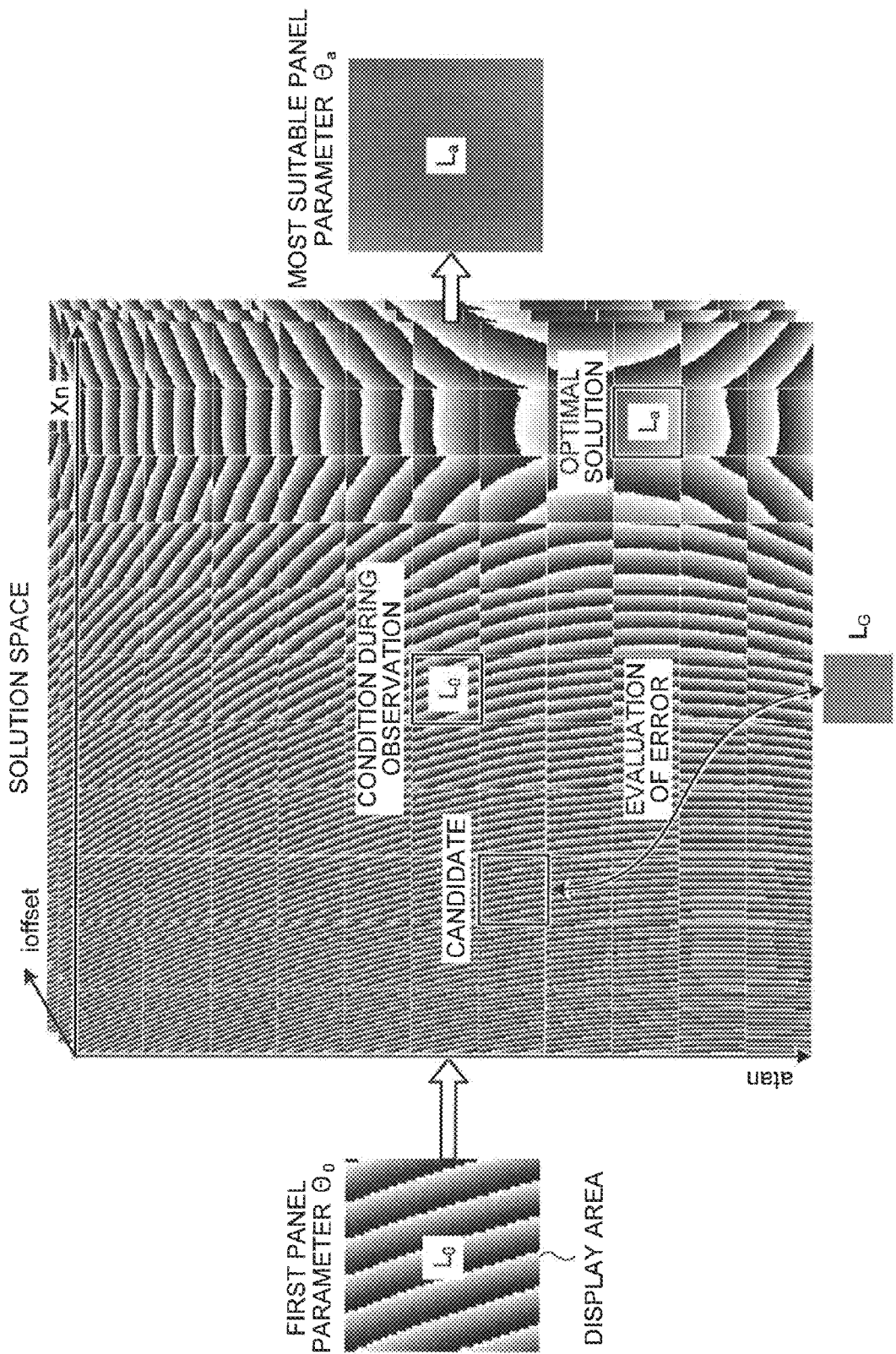
FIG. 8 is a conceptual diagram illustrating a calibration operation performed according to the first embodiment.

FIG. 8 is an image diagram that conceptually illustrates the calibration operation performed by the image processing unit 20 according to the first embodiment. As illustrated in FIG. 8, in the first embodiment; the possible range of each of atan, $X_n$, and $i_{offset}$ is divided equally. Then, regarding each of a plurality of panel parameter candidates that can be formed by a combination of divided points (values); the error between the second parallax number L'(m, n), which represents the parallax image expected to be observed from the viewpoint position in the case when that panel parameter candidate is specified, and the third parallax number $L_G(m, n)$, which represents the parallax image that is supposed to be observed from the viewpoint position, is evaluated. Subsequently, the panel parameter candidate at the time when a second parallax number $L_a(m, n)$ having the smallest error can be obtained is selected as the most suitable panel parameter $\Theta_a$ that has been calibrated.

Figure 9:
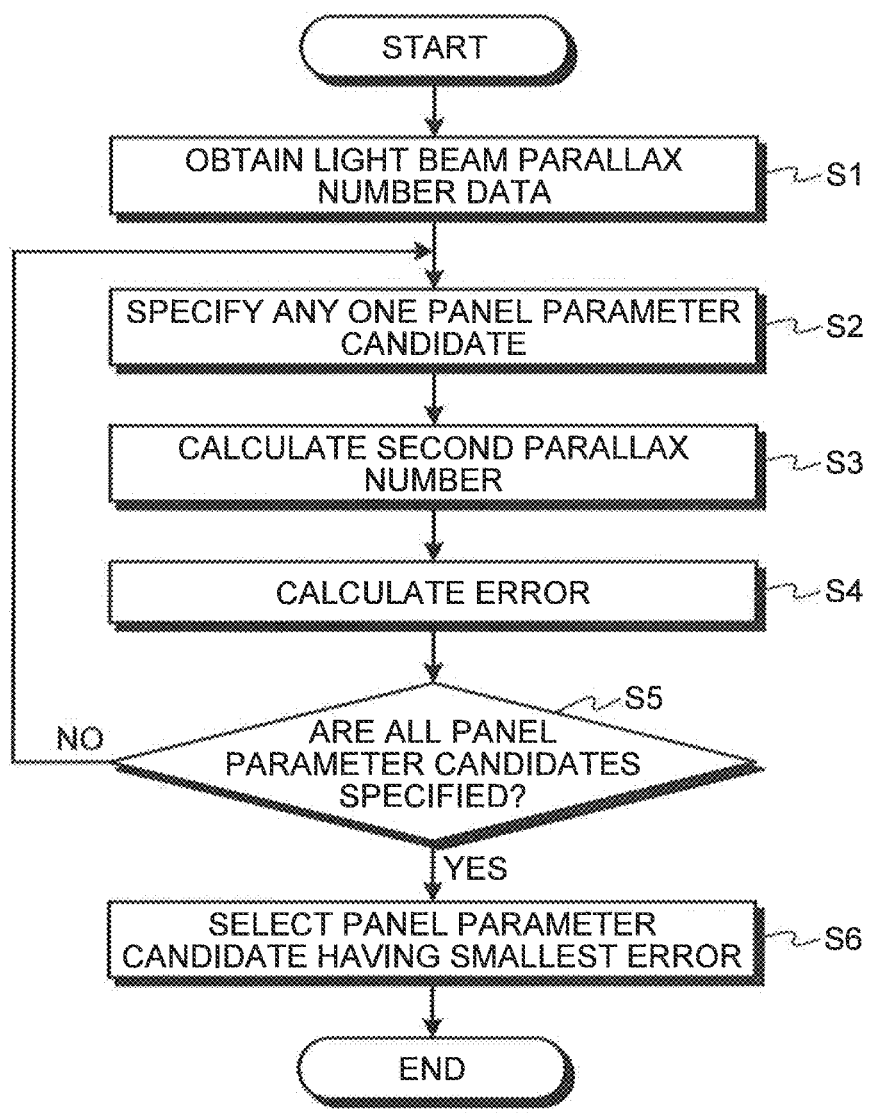
FIG. 9 is a flowchart for explaining an example of the calibration operation performed according to the first embodiment.

FIG. 9 is a flowchart for explaining an example of the calibration operation performed by the image processing unit 20 according to the first embodiment. As illustrated in FIG. 9, the first obtaining unit 21 obtains the light beam parallax number data corresponding to each image area P (Step S1). Then, the specifying unit 22 specifies any one value from a possible range of values of the panel parameter as the panel parameter candidate (Step S2). Subsequently, the first calculating unit 23 calculates the second parallax number for each image area P by adding, to the light beam parallax number data corresponding to that image area P, the difference between the parallax number of the sub-pixels that correspond to the image area P and that can be calculated using the panel parameter candidate specified by the specifying unit 22 and the parallax number of the sub-pixels that correspond to the image area P and that can be calculated using the first panel parameter $\Theta_0$ (Step S3). Then, for each image area P, the selecting unit 25 calculates the error between the second parallax number corresponding to the image area P and the third parallax number obtained corresponding to the image area P by the second obtaining unit 24 (Step S4). Moreover, the selecting unit 25 determines whether or not all panel parameter candidates have been specified (Step S5). If it is determined that all panel parameter candidates have been specified (Yes at Step S5), then the selecting unit 25 selects the panel parameter candidate having the smallest error as the most suitable panel parameter that has been calibrated (Step S6). More particularly, after all panel parameter candidates have been specified, the selecting unit 25 selects the panel parameter candidate corresponding to the smallest error value $E_{min}$ as the most suitable panel parameter $\Theta_a$ that has been calibrated. Meanwhile, if it is determined that all panel parameter candidates are not yet specified (No at Step S5), then the selecting unit 25 instructs the specifying unit 22 to specify the next panel parameter candidate. As a result, the operations from Step S2 are repeatedly performed.

Returning to the explanation with reference to FIG. 7, the third obtaining unit 26 obtains K number of parallax images (where K is an integer equal to or greater than two) that are used in a stereoscopic image. That is, the third obtaining unit 26 has the function of obtaining a stereoscopic image including a plurality of parallax images.

The second calculating unit 27 calculates, for each sub-pixel, the pixel value (the luminance value) of that sub-pixel based on the parallax number of that sub-pixel (in the following explanation, sometimes called a "fourth parallax number") that can be calculated using the panel parameter selected by the selecting unit 25 and based on the parallax images obtained by the third obtaining unit 26. Given below is the detailed explanation of the method of calculating the pixel values of sub-pixels.

Figure 10:
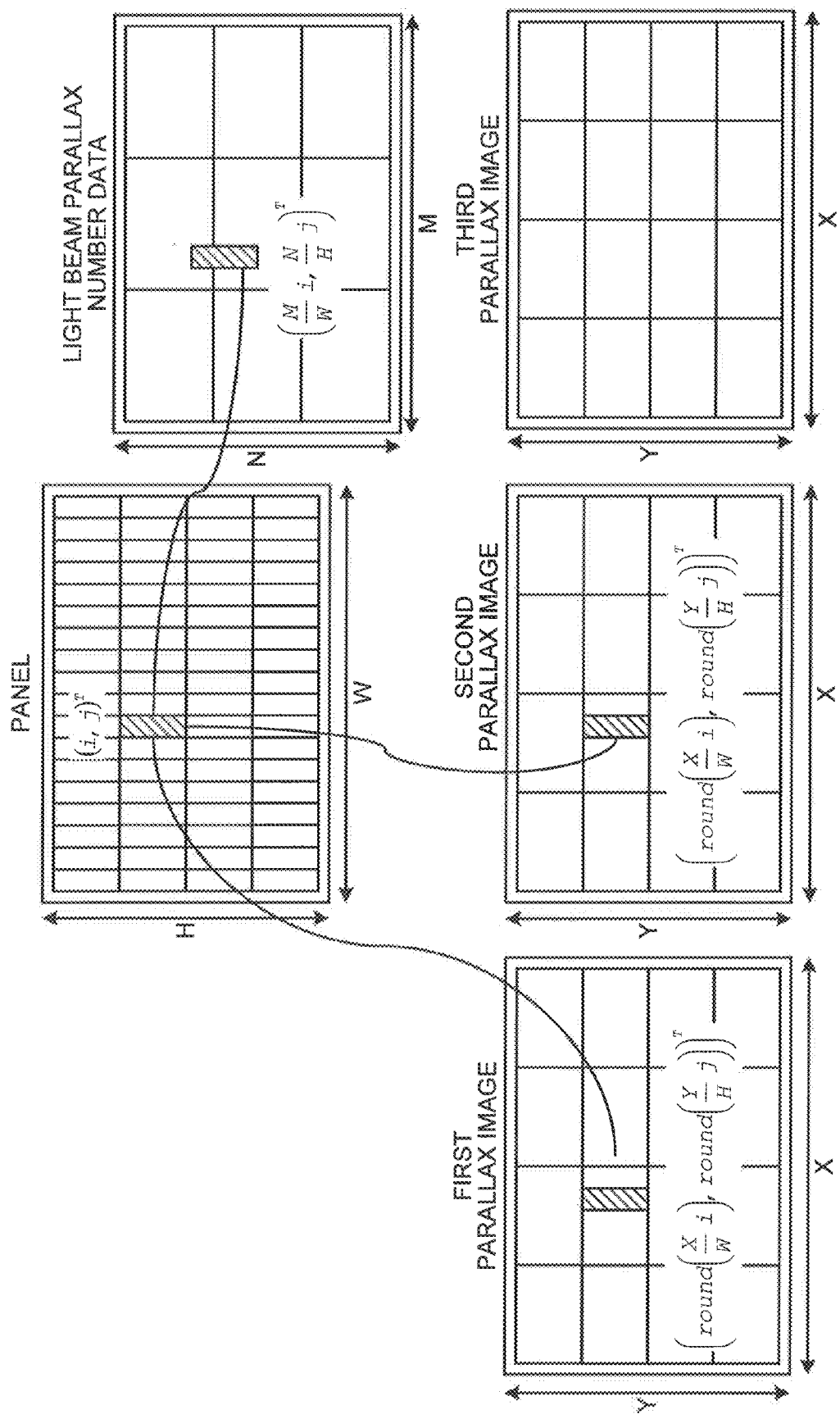
FIG. 10 is a diagram illustrating the relationship between a panel, parallax images, and light beam parallax number data according to the embodiments.

Assume that $(i, j)^T$ represents the position coordinate of a sub-pixel on the panel that is placed beneath a lens. Herein, "T" represents transposition. Moreover, assume that "K" represents the total number of parallaxes. FIG. 10 is a diagram that schematically illustrates the relationship between the panel, the parallax images, and the light beam parallax number data. As illustrated in FIG. 10, assume that "W" (the number of columns) represents the number of sub-pixels of the display element 11 in the first direction (the row direction); assume that "H" (the number of rows) represents the number of sub-pixels of the display element 11 in the second direction (the column direction); assume that "M" (the number of columns) and "N" (the number of rows) represent the number of horizontal divisions and the number of vertical divisions, respectively, of the screen (the display area) of the light beam parallax number data; and assume that "X" and "Y" represent the number of horizontal pixels and the number of vertical pixels, respectively, of each parallax image. Moreover, assume that the sub-pixel $(i, j)^T$ has the parallax number $v(i, j | \Theta_a)$. Then, regarding the parallax image represented by the sub-pixel $(i, j)^T$, the coordinate (x, y) can be expressed using Equation (10) given below.

$$\begin{bmatrix} x \\ y \end{bmatrix} = \begin{bmatrix} \text{round}\left(\frac{X}{W}i\right) \\ \text{round}\left(\frac{Y}{H}j\right) \end{bmatrix} \quad (10)$$

In Equation (10), round(x) indicates rounding off of "x".

As far as calculating the pixel value of a sub-pixel is concerned; although the parallax numbers are continuous values, the parallax images are discrete in nature. Hence, it is necessary to obtain the pixel value by performing linear interpolation or the like. Two discrete parallax numbers having adjacent parallax numbers can be expressed using Equation (11) given below.

ceil($I(i,j|\Theta_a)$)

ceil($v(i,j|_a)$)+1       (11)

Herein, ceil(x) is the largest integer not exceeding "x". Then, by means of linear interpolation, the pixel value of the sub-pixel $(i, j)^T$ can be expressed using Equation (12) given below.

$$r(i, j) = (1-\alpha)I_{ceil(v(i,j|\Theta_a))}\left[\text{round}\left(\frac{X}{W}i\right), \text{round}\left(\frac{Y}{H}j\right)\right] + \\ \alpha I_{ceil(v(i,j|\Theta_a))}\left[\text{round}\left(\frac{X}{W}i\right), \text{round}\left(\frac{Y}{H}j\right)\right] \quad (12)$$

$$\alpha = v(i, j | \Theta_a) - \text{ceil}(v(i, j | \Theta_a))$$

Herein, $I_v(x, y)$ represents the pixel value of the parallax image that has the parallax number v and that is positioned at the coordinate position (x, y).

In this way, the second calculating unit 27 calculates the pixel value of each sub-pixel and generates a stereoscopic image to be displayed on the display unit 10. Then, the second calculating unit 27 outputs that stereoscopic image to the display unit 10.

As described above, in the first embodiment, every time a panel parameter candidate is specified by the specifying unit 22; the specified panel parameter, the first panel parameter $\Theta_0$ indicating the panel parameter at the time of observation, and the first parallax number indicating the parallax image that is actually observed from the predetermined viewpoint position are used to calculate the second parallax number that represents the parallax image which is expected to be observed from the viewpoint position when the panel parameter is changed from the first panel parameter $\Theta_0$ to the specified panel parameter candidate. Then, as the most suitable panel parameter that has been calibrated, such a panel parameter candidate is selected that has the smallest error between the second parallax number that has been calculated and the third parallax number that represents the parallax image which is supposed to be observed from the predetermined viewpoint position. Thus, in the first embodiment, the most suitable panel parameter can be selected by performing only the calculation operation illustrated in FIG. 9. With that, it becomes possible to eliminate the need to repeat in a cyclic manner the conventional operations of changing the panel parameter→performing display that reflects the change in the panel parameter→observation. As a result, it becomes possible to reduce the amount of time required to perform calibration.

Modification Example of First Embodiment

Meanwhile, for example, the first obtaining unit 21 can obtain the first parallax number that has been subjected to distortion correction which is performed to correct distortion in the light beams. The detailed explained is given below. Herein, it is highly likely that the light beam parallax number data that is obtained is not in the rectangular shape of a panel due to distortion, but is distorted to a trapezoidal shape. The coordinate transformation in such distortion correction can be expressed using, for example, Equation (13) given below.

$$\begin{bmatrix} \delta_1(m, n) \\ \delta_2(m, n) \end{bmatrix} = \delta\left(\begin{bmatrix} m \\ n \end{bmatrix}\right) \quad (13)$$

For example, in the case of performing projective transformation, the coordinate transformation is expressed using Equation (14) given below.

$$\delta\left(\begin{bmatrix} m \\ n \end{bmatrix}\right) = \begin{bmatrix} \frac{a_0 m + a_1 n + a_2}{a_6 m + a_7 n + 1} \\ \frac{a_3 m + a_4 n + a_5}{a_8 m + a_9 n + 1} \end{bmatrix} \quad (14)$$

In Equation (14), $a_0$ to $a_9$ represent parameters of projective transformation and can be obtained from the four vertices of the screen of the light beam parallax number data that has been obtained and from the coordinates of the four vertices of the liquid crystal panel (the display element 11).

As a result, the light beam parallax number data corresponding to the sub-pixel position $(i, j)^T$ is expressed using Equation (15) given below.

$$\text{light beam parallax number data corresponding to sub} \\ \text{-pixel position}(i, j)^T = L\left(\delta_1\left(\frac{M}{W}i, \frac{N}{H}j\right), \delta_2\left(\frac{M}{W}i, \frac{N}{H}j\right)\right) \quad (15)$$

Meanwhile, the coordinates identified herein may not be integers. In that case, calculation can be done by performing interpolation with the use of the surrounding light beam parallax number data.

The rest of the contents are identical to the first embodiment. Meanwhile, the configuration can either be such that the first obtaining unit 21 performs distortion correction with respect to the light beam parallax number data obtained from the memory device (not illustrated), or be such that the light beam parallax number data that has been subjected to distortion correction is stored in advance in the memory device (not illustrated). In essence, as long as the first obtaining unit 21 obtains the first parallax number that has been subjected to distortion correction which is performed to correct distortion in the light beams, the purpose is served.

Second Embodiment

As compared to the first embodiment, a second embodiment differs in the way that a correcting unit is disposed that, for each sub-pixel, performs correction for the purpose of setting the parallax number observed from the viewpoint position as the third parallax number using correction data indicating the difference value between the fourth parallax number, which represents the parallax image that is expected to be observed from the viewpoint position when the panel parameter is changed from the first panel parameter $\Theta_0$ to the panel parameter $\Theta_a$ that is selected by the selecting unit 25, and the third parallax number. The detailed explanation is given below. Meanwhile, regarding the aspects identical to the first embodiment, the explanation is not repeated.

Figure 11:
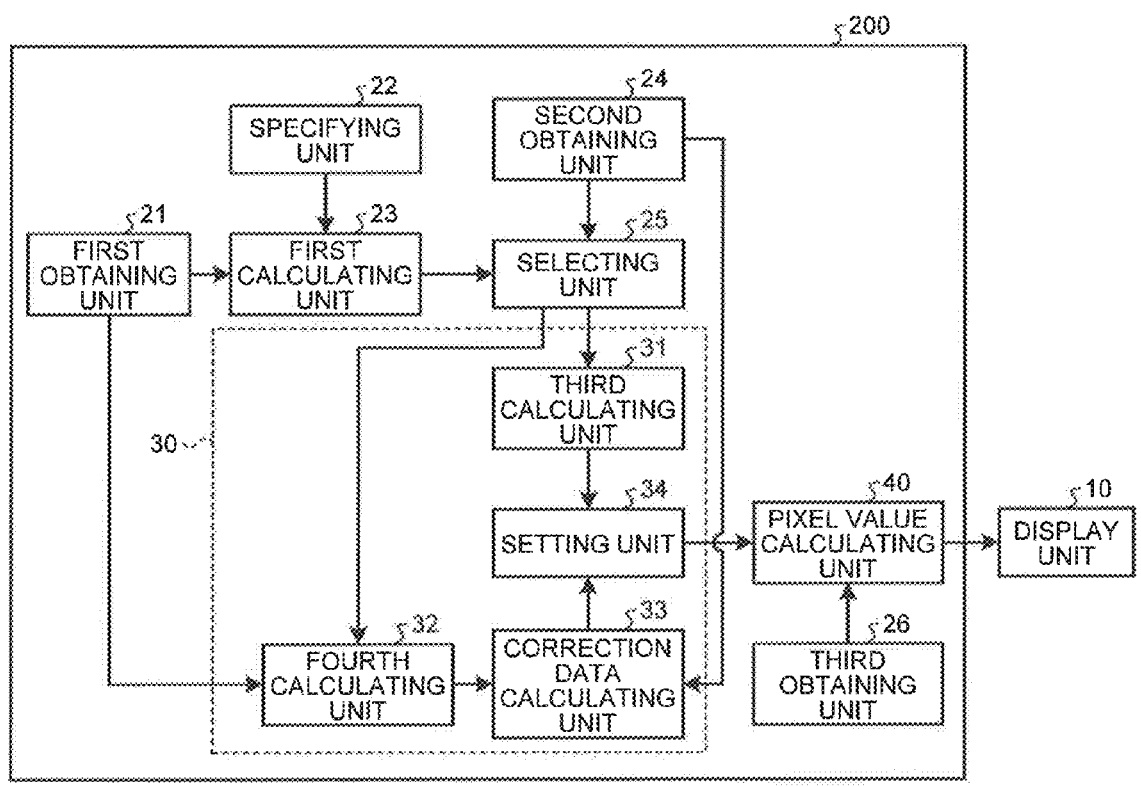
FIG. 11 is a diagram illustrating a configuration example of an image processing unit according to a second embodiment.

FIG. 11 is a block diagram illustrating a configuration example of an image processing unit 200 according to the second embodiment. As illustrated in FIG. 11, the image processing unit 200 includes a correcting unit 30 and a pixel value calculating unit 40 in place of the second calculating unit 27. Moreover, the correcting unit 30 includes a third calculating unit 31, a fourth calculating unit 32, a correction data calculating unit 33, and a setting unit 34.

The third calculating unit 31 calculates, for each sub-pixel (i, j), the parallax number $v(i, j|\Theta_a)$ of that sub-pixel (i, j) using the panel parameter $\Theta_a$ that is selected by the selecting unit 25 (see Equation (1)). In the following explanation, the parallax number of a sub-pixel that can be calculated from the panel parameter $\Theta_a$ is sometimes called a fifth parallax number. Thus, the third calculating unit 31 calculates the fifth parallax number of each sub-pixel using the panel parameter $\Theta_a$ that is selected by the selecting unit 25.

For each sub-pixel (i, j), the fourth calculating unit 32 calculates the fourth parallax number representing the parallax image that is expected to be observed from the viewpoint position when the panel parameter is changed from the first panel parameter $\Theta_0$ to the panel parameter $\Theta_a$, using the first parallax number $L_0$(m, n) that is obtained corresponding to the sub-pixel (i, j) by the first obtaining unit 21 (i.e., the parallax number indicating the parallax image that is actually observed in the image area P corresponding to sub-pixel (i, j) from the predetermined viewpoint position), the first panel parameter $\Theta_0$, and the panel parameter $\Theta_a$ that is selected by the selecting unit 25. A fourth parallax number L' (m, n|$\Theta_a$) that, from among the parallax images displayed in the image area P(m, n) corresponding to the sub-pixel (i, j), represents the parallax image which is expected to be observed from the viewpoint position when the panel parameter is changed from the first panel parameter $\Theta_0$ to the panel parameter $\Theta_a$ can be expressed using Equation (16) given below (essentially identical to Equation (6) given above).

$$L'(m, n \mid \Theta_a) = L_0(m, n) + \left\{ v\left(\frac{W}{M}m, \frac{H}{N}n \mid \Theta_a\right) - v\left(\frac{W}{M}m, \frac{H}{N}n \mid \Theta_0\right) \right\} \quad (16)$$

The correction data calculating unit 33 calculates, for each sub-pixel (i, j), correction data that indicates the difference between the fourth parallax number L' (m, n|$\Theta_a$) corresponding to the sub-image (i, j) and the third parallax number that is obtained corresponding to the sub-pixel (i, j) by the second obtaining unit 24 (i.e., the parallax number that represents the parallax image which is supposed to be observed in the image area P(m, n) corresponding to the sub-pixel (i, j) from the predetermined viewpoint position). If C(m, n) represents the correction data corresponding to the sub-pixel (i, j) and if $k_{dst}$ represents the third parallax number; then the correction data C(m, n) can be expressed using Equation (17) given below.

$$C(m,n) = k_{dst} - L'(m,n \mid \Theta_a) \quad (17)$$

Moreover, as described above, the relationship between the sub-pixel position $(i, j)^T$ and the coordinate position $(m, n)^T$ of the image area P can be expressed using Equation (2) given above. Consequently, the correction data C(m, n) of the sub-pixel (i, j) can also be expressed as C((M×i)/W, (N×j)/H).

For each sub-pixel (i, j); the setting unit 34 sets, as the parallax number of the sub-pixel (i, j), the remainder of the value obtained by dividing the value calculated by adding the fifth parallax number v(i, j|$\Theta_a$) corresponding to the sub-pixel (i, j) and the correction data C((M×i)/W, (N×j)/H) corresponding to the sub-pixel by the number of parallaxes K. With that, the parallax image that is observed in the image area P corresponding to the sub-pixel (i, j) from the predetermined viewpoint position can be set to the parallax image having the third parallax number $k_{dst}$. That is, it can be said that, for each sub-pixel (i, j), the correcting unit 30 performs correction with respect to the fifth parallax number v(i, j|$\Theta_a$) corresponding to the sub-pixel (i, j) using the correction data C((M×i)/W, (N×j)/H) corresponding to the sub-pixel (i, j) for the purpose of setting the parallax number observed from the viewpoint position as the third parallax number $k_{dst}$. After the setting (correction) is performed by the setting unit 34, a parallax number v'(i, j|$\Theta_a$) corresponding to the sub-pixel (i, j) can be expressed using Equation (18) given below.

$$v'(i, j \mid \Theta_a) = \mathrm{mod}\left[ v'(i, j \mid \Theta_a) + C\left(\frac{M}{W}i, \frac{N}{H}j\right), k \right] \quad (18)$$

Given below is the explanation regarding the pixel value calculating unit 40. Based on the post-correction parallax number (i.e., the parallax number set by the setting unit 34) of each sub-pixel and based on a plurality of parallax images obtained by the third obtaining unit 26; the pixel value calculating unit 40 calculates the pixel value (the luminance value) of that sub-pixel. Herein, the method of calculating the pixel value of each sub-pixel is identical to the calculation method implemented by the second calculating unit 27 according to the first embodiment. Hence, the detailed explanation of the calculation method is not repeated. In an identical manner to the second calculating unit 27, the pixel value calculating unit 40 calculates the pixel value of each pixel and generates a stereoscopic image to be displayed on the display unit 10. Then, the pixel value calculating unit 40 outputs that stereoscopic image to the display unit 10.

As described above, in the second embodiment, the calibration operation described earlier is performed. In addition, for each sub-pixel, correction is performed for the purpose of setting the parallax number observed from the viewpoint position as the third parallax number, using correction data that indicates the difference value between the fourth parallax number, which represents the parallax image that is expected to be observed from the viewpoint position when the panel parameter is changed from the first panel, parameter $\Theta_0$ to the panel parameter $\Theta_a$, and the third parallax number. With that, not only it becomes possible to reduce the amount of time required to perform calibration, but it also becomes to prevent a situation in which the display area (the screen) for displaying a stereoscopic image gets partitioned into an area within which the stereoscopic image can be viewed and an area within which the stereoscopic image cannot be viewed (i.e., a pseudoscopic area).

In the embodiments described above, the light beam control element 12 is disposed in such a way that the extending direction of the optical apertures thereof has a predetermined tilt with respect to the second direction (the column direction) of the display element 11. Herein, it is possible to change the degree of tilt in an arbitrary manner. Alternatively, for example, the configuration can be such that the light beam control element 12 is disposed in such a way that the extending direction of the optical apertures thereof is consistent with the second direction of the display element 11 (i.e., the configuration of a vertical lens).

Meanwhile, the image processing unit according to each embodiment described above (i.e., the image processing unit 20 and the image processing unit 200) has the hardware configuration that includes a central processing unit (CPU), a read only memory (ROM), a random access memory (RAM), and a communication I/F device. Herein, the functions of each of the abovementioned constituent elements (the first obtaining unit 21, the specifying unit 22, the first calculating unit 23, the second obtaining unit 24, the selecting unit 25, the third obtaining unit 26, the second calculating unit 27, the correcting unit 30, and the pixel value calculating unit 40) is implemented when the CPU loads computer programs, which are stored in the ROM, in the RAM and executes those computer programs. However, that is not the only possible case. Alternatively, at least some of the functions of the constituent elements can be implemented using dedicated hardware circuits.

Meanwhile, the computer programs executed in the image processing unit according to each embodiment described above (i.e., the image processing unit 20 and the image processing unit 200) can be saved as downloadable files on a computer connected to the Internet or can be made available for distribution through a network such as the Internet. Alternatively, the computer programs executed in the image processing unit according to each embodiment described above (i.e., the image processing unit 20 and the image processing unit 200) can be stored in advance in a nonvolatile memory medium such as a ROM.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing device comprising:
    a first obtaining unit configured to obtain a first parallax number representing a parallax image that is actually observed from a predetermined viewpoint position from among parallax images that are displayed on a display unit which includes a display element having a plurality of pixels arranged therein and a light beam control element for controlling emitting direction of light beams emitted from the display element and which is capable of displaying a stereoscopic image that includes a plurality of parallax images having mutually different parallaxes;
    a specifying unit configured to, as a panel parameter candidate, specify a first panel parameter candidate or a second panel parameter candidate, the first panel parameter candidate and the second panel parameter candidate being any values within a possible range of values of a panel parameter which is related to a correspondence relationship between the display element and the light beam control element;
    a first calculator configured to, using the first or second panel parameter candidate specified by the specifying unit and using a first panel parameter indicating the panel parameter at the time of observation, calculate a second parallax number which represents a parallax image that is expected to be observed from the viewpoint position when the panel parameter is changed from the first panel parameter to the first or second panel parameter candidate specified by the specifying unit;
    a second obtaining unit configured to obtain a third parallax number which represents a parallax image that is supposed to be observed from the viewpoint position; and
    a selector configured to, when an error between a second parallax number that is calculated when the first panel parameter candidate is specified by the specifying unit, and the third parallax number is smaller than an error between a second parallax number that is calculated when the second panel parameter candidate that is different from the first panel parameter candidate is specified, and the third parallax number, select the first panel parameter candidate as the panel parameter.

2. The device according to claim 1, wherein, from among a plurality of panel parameter candidates specifiable by the specifying unit including the first panel parameter candidate and the second panel parameter candidate, the selector selects a panel parameter candidate having the smallest error between a second parallax number that is calculated when the panel parameter candidate is specified and the third parallax number as the panel parameter.

3. The device according to claim 1, wherein
    the first obtaining unit obtains the first parallax number corresponding to an image area which is included in a display area of the display unit in which the stereoscopic image is displayed, and
    the first calculator calculates the second parallax number corresponding to the image area by adding, to the first parallax number corresponding to the image area, differences between parallax numbers of the pixels that correspond to the image area and that can be calculated using the panel parameter candidate specified by the specifying unit from among a plurality of parameter candidates specifiable by the specifying unit including the first panel parameter candidate and the second panel parameter candidate and parallax numbers of the pixels that correspond to the image area and that can be calculated using the first panel parameter.

4. The device according to claim 1, further comprising a correcting unit configured to, for each of the pixels, perform correction for a purpose of setting the parallax number observed from the viewpoint position as the third parallax number using correction data indicating a difference value between a fourth parallax number which represents a parallax image that is expected to be observed from the view point position when the panel parameter is changed from the first panel parameter to the panel parameter selected by the selector, and the third parallax number.

5. The device according to claim 1, wherein the first obtaining unit obtains the first parallax number that has been subjected to distortion correction which is performed to correct distortion in light beams.

6. The device according to claim 1, further comprising:
    a third obtaining unit configured to obtain a plurality of parallax images; and
    a second calculator configured to, for each of the pixels, calculate a pixel value of the pixel based on a fourth parallax number, which indicates a parallax number of the pixel that can be calculated using the panel parameter selected by the selector, and based on the plurality of parallax images obtained by the third obtaining unit.

7. The device according to claim 2, wherein, when an error between the first parallax number and the third parallax number is smaller than an error between a second parallax number that is calculated after each of the plurality of panel parameter candidates specifiable by the specifying unit is specified, and the third parallax number, the selector selects the first panel parameter as the panel parameter.

8. An image processing method comprising:
    obtaining a first parallax number representing a parallax image that is actually observed from a predetermined viewpoint position from among parallax images that are displayed on a display unit which includes a display element having a plurality of pixels arranged therein and a light beam control element for controlling emitting direction of light beams emitted from the display element and which is capable of displaying a stereoscopic image that includes a plurality of parallax images having mutually different parallaxes;
    specifying, as a panel parameter candidate, a first panel parameter candidate or a second panel parameter candidate, the first panel parameter candidate and the second panel parameter candidate being any values within a possible range of values of a panel parameter which is related to a correspondence relationship between the display element and the light beam control element;

calculating, using the specified first or second panel parameter candidate and using a first panel parameter indicating the panel parameter at the time of observation, a second parallax number which represents a parallax image that is expected to be observed from the viewpoint position when the panel parameter is changed from the first panel parameter to the specified first or second panel parameter candidate;

obtaining a third parallax number which represents a parallax image that is supposed to be observed from the viewpoint position; and selecting, when an error between a second parallax number that is calculated when the first panel parameter candidate is specified, and the third parallax number is smaller than an error between second parallax number that is calculated when the second panel parameter candidate that is different from the first panel parameter candidate is specified, and the third parallax number, the first panel parameter candidate as the panel parameter.

9. A computer program product comprising a non-transitory computer readable medium including an image processing program, wherein the program, when executed by a computer, causes the computer to function as:

a first obtaining unit configured to obtain a first parallax number representing a parallax image that is actually observed from a predetermined viewpoint position from among parallax images that are displayed on a display unit which includes a display element having a plurality of pixels arranged therein and a light beam control element for controlling emitting direction of light beams emitted from the display element and which is capable of displaying a stereoscopic image that includes a plurality of parallax images having mutually different parallaxes;

a specifying unit configured to, as a panel parameter candidate, specify a first panel parameter candidate or a second panel parameter candidate, the first panel parameter candidate and the second panel parameter candidate being any values within a possible range of values of a panel parameter which is related to a correspondence relationship between the display element and the light beam control element;

a first calculator configured to, using the first or second panel parameter candidate specified by the specifying unit and using a first panel parameter indicating the panel parameter at the time of observation, calculate a second parallax number which represents a parallax image that is expected to be observed from the viewpoint position when the panel parameter is changed from the first panel parameter to the first or second panel parameter candidate specified by the specifying unit;

a second obtaining unit configured to obtain a third parallax number which represents a parallax image that is supposed to be observed from the viewpoint position; and a selector configured to, when an error between a second parallax number that is calculated when the first panel parameter candidate is specified by the specifying unit, and the third parallax number is smaller than an error between a second parallax number that is calculated when the second panel parameter candidate that is different from the first panel parameter candidate is specified, and the third parallax number, select the first panel parameter candidate as the panel parameter.

10. A stereoscopic display apparatus comprising:

a display unit that includes a display element having a plurality of pixels arranged therein and a light beam control element for controlling emitting direction of light beams emitted from the display element, and that is capable of displaying a stereoscopic image which includes a plurality of parallax images having mutually different parallaxes;

a first obtaining unit configured to obtain a first parallax number representing a parallax image that is actually observed from a predetermined viewpoint position from among parallax images that are displayed on the display unit;

a specifying unit configured to, as a panel parameter candidate, specify a first panel parameter candidate or a second panel parameter candidate, the first panel parameter candidate and the second panel parameter candidate being any values within a possible range of values of a panel parameter which is related to a correspondence relationship between the display element and the light beam control element;

a first calculator configured to, using the first or second panel parameter candidate specified by the specifying unit and using a first panel parameter indicating the panel parameter at the time of observation, calculate a second parallax number which represents a parallax image that is expected to be observed from the viewpoint position when the panel parameter is changed from the first panel parameter to the first or second panel parameter candidate specified by the specifying unit;

a second obtaining unit configured to obtain a third parallax number which represents a parallax image that is supposed to be observed from the viewpoint position; and a selector configured to, when an error between a second parallax number that is calculated when the first panel parameter candidate is specified by the specifying unit, and the third parallax number is smaller than an error between a second parallax number that is calculated when the second panel parameter candidate that is different from the first panel parameter candidate is specified, and the third parallax number, select the first panel parameter candidate as the panel parameter.

* * * * *